United States Patent
Kim

(10) Patent No.: US 9,412,978 B2
(45) Date of Patent: Aug. 9, 2016

(54) POUCH TYPE BATTERY

(75) Inventor: Jaehyung Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/594,136

(22) Filed: Aug. 24, 2012

(65) Prior Publication Data

US 2013/0216896 A1  Aug. 22, 2013

(30) Foreign Application Priority Data

Feb. 16, 2012  (KR) ........................ 10-2012-0016050

(51) Int. Cl.
*H01M 2/02* (2006.01)
*H01M 2/08* (2006.01)

(52) U.S. Cl.
CPC .............. *H01M 2/08* (2013.01); *H01M 2/0275* (2013.01); *H01M 2/0287* (2013.01)

(58) Field of Classification Search
USPC ....................................................... 429/162
See application file for complete search history.

(56) References Cited

U.S. PATENT DOCUMENTS

| 4,256,815 | A | * | 3/1981 | Smilanich et al. | ............ 429/185 |
| 7,524,577 | B2 | * | 4/2009 | Bates | ............... 429/66 |
| 2005/0142439 | A1 | | 6/2005 | Lee et al. | |
| 2007/0202398 | A1 | * | 8/2007 | Kim | .............................. 429/176 |
| 2009/0186270 | A1 | * | 7/2009 | Harada et al. | ................. 429/185 |
| 2012/0219847 | A1 | * | 8/2012 | Hong et al. | .................... 429/163 |

FOREIGN PATENT DOCUMENTS

JP  2001250516 A  *  9/2001
WO  WO 2009144955 A1  *  12/2009

* cited by examiner

*Primary Examiner* — Patrick Ryan
*Assistant Examiner* — Haixia Zhang
(74) *Attorney, Agent, or Firm* — Robert E. Bushnell, Esq.

(57) ABSTRACT

A pouch type battery that can protect a metal layer exposed to ends of a pouch using a photocurable adhesive and can fix adhesion parts to the pouch, thereby achieving a simplified, automated process, instead of a manually taping process. The pouch type battery includes an electrode assembly including a first electrode plate, a second electrode plate and a separator, a pouch accommodating the electrode assembly and having adhesion parts formed by adhering opposing edges, and a photocurable adhesive applied to the adhesion parts of the pouch and sides of the pouch.

13 Claims, 5 Drawing Sheets

POUCH TYPE BATTERY

CLAIM OF PRIORITY

This application makes reference to, incorporates the same herein, and claims all benefits accruing under 35 U.S.C. §119 from an application earlier filed in the Korean Intellectual Property Office on 16 Feb. 2012 and there duly assigned Serial No. 10-2012-0016050.

BACKGROUND OF THE INVENTION

1. Field of the Invention

Embodiments of the present invention generally relate to a pouch type battery.

2. Description of the Related Art

Unlike primary batteries which cannot be recharged, secondary batteries can be repeatedly charged and discharged. Low capacity batteries that use single battery cells are used as power sources for various small portable electronic devices such as cellular phones, and camcorders. High power batteries that use many battery cells connected to each other in a battery pack are used as power sources for electric scooters, and hybrid electric vehicles (HEV).

Secondary batteries are manufactured in various shapes. Specifically, a pouch type battery includes an electrode assembly having a separator as an insulator disposed between a positive electrode plate and a negative electrode plate, and a thin flexible pouch that accommodates the electrode assembly. Here, the pouch accommodates an inner space formed by adhering its edges to each other.

The above information disclosed in this Related Art section is only for enhancement of understanding of the background of the invention and therefore it may contain information that does not form the prior art that is already known to a person of ordinary skill in the art.

SUMMARY OF THE INVENTION

Embodiments of the present invention provide a pouch type battery, which can protect a metal layer exposed to ends of a pouch using a photocurable adhesive and can fix adhesion parts to the pouch, thereby achieving a simplified, automated process, instead of a manually taping process.

According to an embodiment of the present invention, a pouch type battery is provided that may include an electrode assembly including a first electrode plate, a second electrode plate and a separator, a pouch accommodating the electrode assembly and having adhesion parts formed by adhering its opposing sides, and a photocurable adhesive applied to the adhesion parts of the pouch and sides of the pouch.

The photocurable adhesive may adhere and fix the adhesion parts of the pouch to the opposing sides of the pouch.

The pouch may have a multi-layered thin film structure including a metal layer that is a thin film, a first insulating layer covering one surface of the metal layer, and a second insulating layer covering the other surface opposite to the one surface of the metal layer.

The metal layer exposed to ends of the adhesion parts may be covered by the photocurable adhesive.

The pouch may include a first pouch and a second pouch, which are folded on one side along a length of the pouch.

The pouch may further include a planar part connecting between the adhesion parts formed at its opposing sides by adhering the first pouch and the second pouch and, formed by adhering the first pouch and the second pouch.

The pouch type battery may further include a first electrode tab electrically connected to the first electrode plate of the electrode assembly and exposed to the outside through the planar part of the pouch, and a second electrode tab connected to the second electrode plate of the electrode assembly and exposed to the outside through the planar part of the pouch.

The adhesion parts may be bent toward the first pouch and fixed to side surfaces of the pouch by the photocurable adhesive.

The photocurable adhesive may cover ends of the adhesion parts and the opposing sides of the pouch.

The photocurable adhesive may cover the opposing sides of the pouch making contact with the ends of the adhesion parts, exterior surfaces of the adhesion parts extending from the ends of the adhesion parts and the ends of the adhesion parts.

The photocurable adhesive, disposed between the opposing sides of the pouch and interior sides of the adhesion parts, may adhere the adhesion parts to the opposing sides of the pouch and may cover ends of the adhesion parts bent toward the sides of the pouch.

The photocurable adhesive may be a two-component adhesive having an insulating hardener hardened by ultraviolet (UV) rays and an insulating resin mixed therein.

According to an embodiment of the present invention, a pouch type battery is provided that may include an electrode assembly, and a pouch accommodating the electrode assembly and having adhesion parts formed by adhering its opposing sides, wherein the adhesion parts of the pouch are fixed to the opposing sides of the pouch by a photocurable adhesive applied to ends of the adhesion parts of the pouch and the opposing sides of the pouch.

As described above, in the pouch type battery according to the embodiment of the, since a metal layer exposed to ends of a pouch can be protected using a photocurable adhesive and adhesion parts can be fixed to the pouch, a simplified, automated process, instead of a manually taping process, can be achieved. In addition, adhesion quality can be improved.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
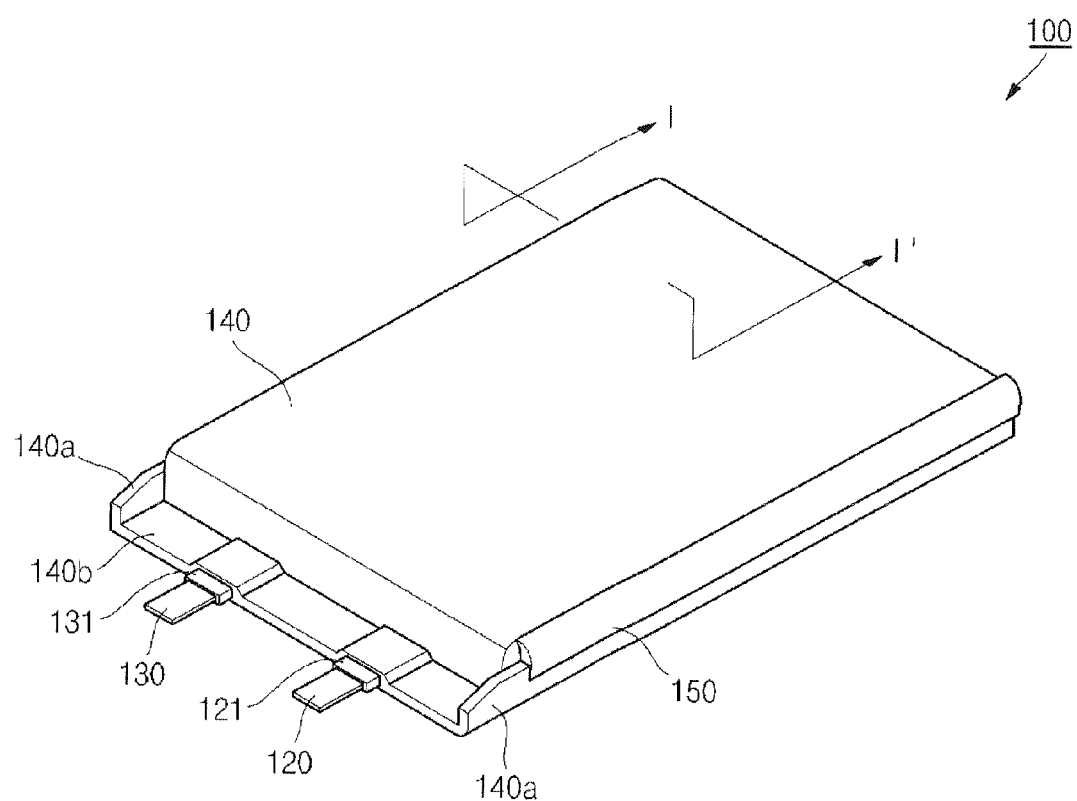
FIG. 1 is a perspective view of a pouch type battery according to an embodiment of the present invention.

Hereinafter, examples of embodiments of the invention will be described in detail with reference to the accompanying drawings such that they can easily be made and used by those skilled in the art. The same reference numerals are used throughout the drawings to refer to the same or like elements.

As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

Generally, a pouch for a secondary battery has a multi-layered structure including a metal layer and insulating layers covering surfaces of the metal layer. The insulating layers prevent the metal layer disposed between insulating layers from being shorted to a conductive material inside and outside the pouch. However, if edges of the pouch are not adhered to each other using a separate tape, the metal layer may be exposed to the outside, resulting in a risk of an electrical short. However, the adhesion using a tape cannot be automatically processed. In addition, an operator should manually perform an adhering operation on each pouch type battery, making the adhering operation cumbersome. Further, adhering positions and strength may not be uniform due to an operational deviation.

Figure 2:
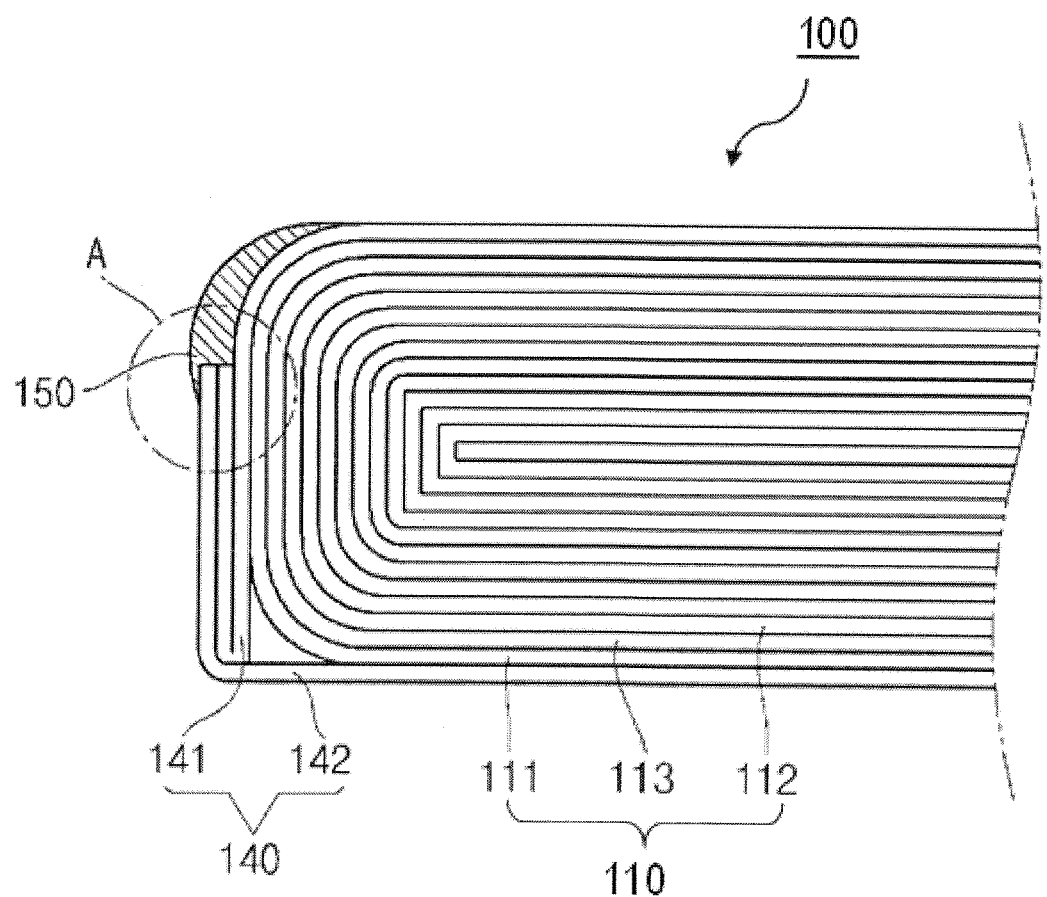
FIG. 2 is a cross-sectional view of an example of the pouch type battery taken along the line I-I' of FIG. 1.
Figure 3:
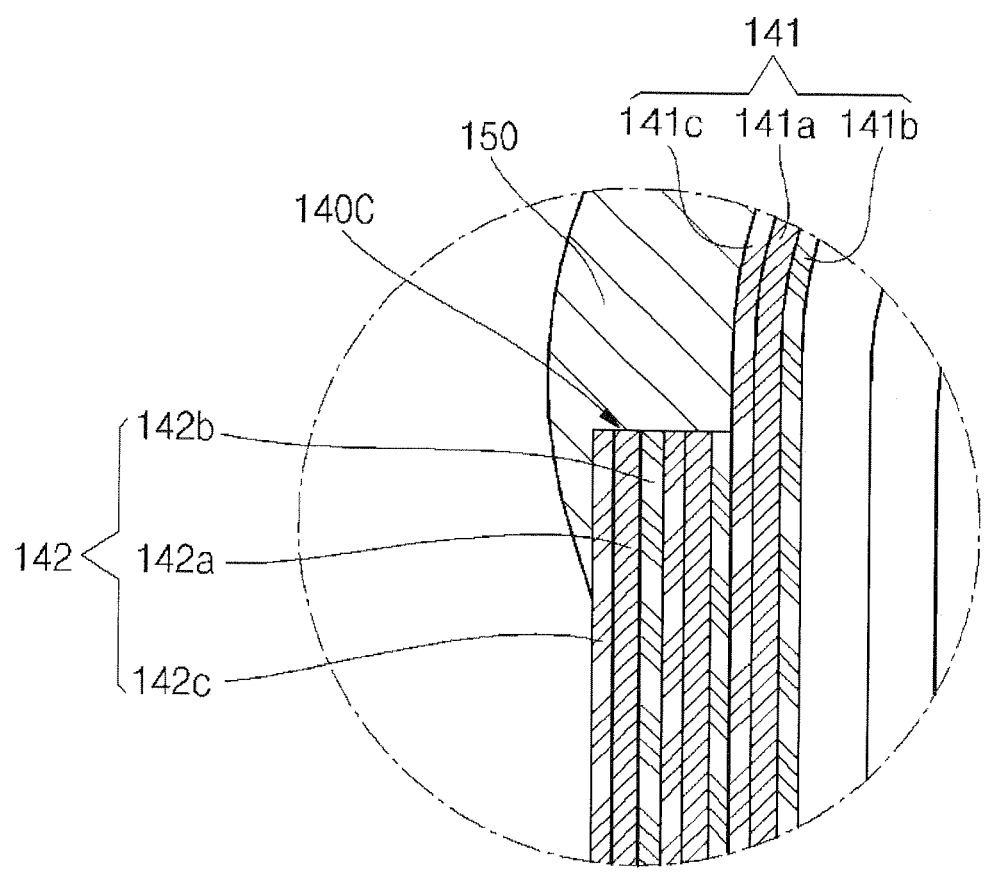
FIG. 3 is an enlarged view illustrating an 'A' portion of FIG. 2.

Hereinafter, a pouch type battery according to an embodiment of the present invention will be described with reference to FIGS. 1 to 3. FIG. 1 is a perspective view of a pouch type battery according to an embodiment of the present invention, FIG. 2 is a cross-sectional view of an example of the pouch type battery taken along the line I-I' of FIG. 1 and FIG. 3 is an enlarged view illustrating an 'A' portion of FIG. 2.

First, as shown in FIGS. 1 to 4, the pouch type battery 100 may include an electrode assembly 110, a first electrode tab 120, a second electrode tab 130, a pouch 140 and a photocurable adhesive 150.

The electrode assembly 110 may be fabricated by winding or stacking a stacked structure of a first electrode plate 111, a separator 113 and a second electrode plate 112, which are formed of thin plates or layers. The first electrode plate 111 may function as a positive electrode and the second electrode plate 112 may function as a negative electrode, or vice versa. In addition, the electrode assembly 110 may be accommodated in the pouch 140. For example, the electrode assembly 110 may be retained in a cavity of the pouch 140.

The first electrode plate 111 may be formed by applying a first electrode active material (e.g., a transition metal oxide) on a first electrode collector formed of metal foil (e.g., aluminum foil). The material of the first electrode plate 111 is not limited to the specific materials described herein.

The second electrode plate 112 may be formed by applying a second electrode active material (e.g., graphite or carbon) on a second electrode collector formed of metal foil (e.g., nickel or copper foil). The material of the second electrode plate 112 is not limited to the specific materials described herein.

The separator 113 may be disposed between the first electrode plate 111 and the second electrode plate 112 to reduce the possibility of and/or prevent an electrical short circuit, and to facilitate movement of transition metal ions. The separator 113 may be formed of polypropylene, polyethylene, or a composite film of polypropylene and polyethylene. However, the material of the separator 113 is not limited to the specific materials described herein.

In the electrode assembly 110, the first electrode plate 111 and the second electrode plate 112 may be electrically connected to the first electrode tab 120 and the second electrode tab 130, respectively.

The electrode assembly 110 may be accommodated in the pouch 140 with an electrolyte. The electrolyte may include an organic solvent such as ethylene carbonate (EC), propylene carbonate (PC), diethyl carbonate (DEC), ethylmethyl carbonate (EMC) or dimethyl carbonate (DMC), and a lithium salt such as $LiPF_6$ or $LiBF_4$. In addition, the electrolyte may be in a liquid, solid or gel phase.

The first electrode tab 120 may be electrically connected to the first electrode plate 111 of the electrode assembly 110. The first electrode tab 120 may outwardly extends and protrude to the outside through a planar part 140b of the pouch 140. The planar part 140b will later be described in detail. Here, the first electrode tab 120 further may include a first insulation tape 121 provided inside the planar part 140b so as to surround the first electrode tab 120. The first insulation tape 121 may serve to prevent an electrical short circuit of metal layers 141a and 142a of the pouch 140. The first electrode tab 120 may include aluminum or an aluminum alloy. However, the material of the first electrode tab 120 is not limited to the materials specifically described herein.

The second electrode tab 130 may be electrically connected to the second electrode plate 112 of the electrode assembly 110. The second electrode tab 130 may outwardly extends and protrude to the outside through the planar part 140b of the pouch 140. The second electrode tab 130 may further include a second insulation tape 131 inside the planar part 140b so as to surround the second electrode tab 130. The second insulation tape 131 may prevent or reduce a likelihood of an electrical short circuit of metal layers 141a and 142a of the pouch 140.

The first electrode tab 120 and the second electrode tab 130 may protrude and extend outside of the pouch 120 through the planar part 140b formed in front of the pouch 140. The first electrode tab 120 and the second electrode tab 1 30 may extend beyond a peripheral edge of the pouch 140. The first electrode tab 120 and the second electrode tab 130 may be disposed parallel to each other. In addition, each of the first electrode tab 120 and the second electrode tab 130 may be in a shape of a planar plate.

The pouch 140 may generally include a first pouch 141 and a second pouch 142. Each of the first pouch 141 and the second pouch 142 may be formed of an integrally formed rectangular pouch film that is folded on one side along a length of the pouch 140.

The first pouch 141 may be formed by a pressing process and may have a groove to accommodate the electrode assembly 110. After the electrode assembly 110 is disposed in the groove of the first pouch 141, the pouch 140, e.g., edges of the pouch 140, may be fused or adhered by heating and tightly pressing corresponding edges of the first pouch 141 and the second pouch 142. An electrolyte may be retained within the pouch 120.

Adhesion parts 140a may be at opposite sides of the pouch 140, corresponding in position to opposite sides of the electrode assembly 110. The adhesion parts 140a may be formed by fusing or adhering together the first pouch 141 and the second pouch 142, e.g., opposing edges of the first pouch 141 and the second pouch 142. The adhesion parts 140a may be parts extending from the opposing edges of the pouch 140 by a predetermined length and may be bent toward the first pouch 141. The adhesion parts 140a are bent to be fixed and adhered to the opposing sides of the pouch 140 by the photocurable adhesive 150.

The first pouch 141 and the second pouch 142 may have the planar part 140b which the first electrode tab 120 and the second electrode tab 130 outwardly extend and protrude. Here, the, planar part 140b may include portions of the first pouch 141 and the second pouch 142 that are adhered or welded to each other and horizontally extend by a predetermined length. The planar part 140b may be disposed between the opposing adhesion parts 140a.

That is to say, the pouch 140 according to some embodiments, the adhesion parts 140a may be formed at opposing side surfaces of the first pouch 141 and the second pouch 142 and the planar part 140b may be formed by adhering edges of one side of the first pouch 141 and the second pouch 142. The planar part 140b may correspond to one protruding side of each of the first electrode tab 120 and the second electrode tab 130 electrically connected to the first and second electrode plates 111 and 112 of the electrode assembly 110. The adhesion parts 140a are opposing sides bent outwardly in the groove of the first pouch 141.

The first pouch 141 may have a multi-layered structure including the metal layer 141a, a first insulation layer 141b formed on one surface of the metal layer 141a, and a second insulation layer 141c formed on the other surface of the metal layer 141a. The second pouch 142 may also have the same multi-layered structure as the first pouch 141 in which the metal layer 142a, a first insulation layer 142b are formed on one surface of the metal layer 142a, and a second insulation layer 142c is formed on the other surface of the metal layer 142a.

The adhesion parts 140a and the planar part 140b may be formed by adhering or welding first insulation layers 141b and 142b of the first and second pouches 141 and 142 together. The first insulation layers 141b and 142b of the first and second pouches 141 and 142 may be made of a thermally adhesive material to facilitate adhering or welding the first pouch 141 and the second pouch 142 together.

The photocurable adhesive 150 may be coated on the adhesion parts 140a bent from the opposing sides of the pouch 140 toward the first pouch 141 and may be formed to cover ends 140c of the adhesion parts 140a. The photocurable adhesive 150 may be a two-component adhesive having an insulating hardener hardened by ultraviolet (UV) rays and an insulating resin mixed therein. The photocurable adhesive 150 maybe transparent or colorless, or may have any color.

The coating and hardening of the photocurable adhesive 150 will now be described. First, the photocurable adhesive 150 may be coated on the adhesion parts 140a bent from the sides of the pouch 140 toward the first pouch 141. Preferably, the photocurable adhesive 150 is coated between the sides of the pouch 140 and the ends 140c of the adhesion parts 140a to entirely cover the ends 140c of the adhesion parts 140a bent to the opposing sides of the pouch 140. That is to say, the photocurable adhesive 150 isolates the metal layers 141a and 142a exposed to the ends 140c of the adhesion parts 140a from external devices. Therefore, the photocurable adhesive 150 may prevent the metal layers 141a and 142a of the adhesion parts 140a from being exposed to the outside, thereby preventing an electrical short circuit that may occur between the metal layers 141a and 142a and the external devices.

When UV rays are radiated to the photocurable adhesive 150, the photocurable adhesive 150 may be hardened, thereby adhering and fixing the adhesion parts 140a to the sides of the pouch 140.

The photocurable adhesive 150 can fix the adhesion parts 140a of the pouch 140 to the sides of the pouch 140 without using a separate tape and can protect the metal layers 141a and 142a exposed to the ends 140c of the adhesion parts 140a from the external devices.

Figure 4:
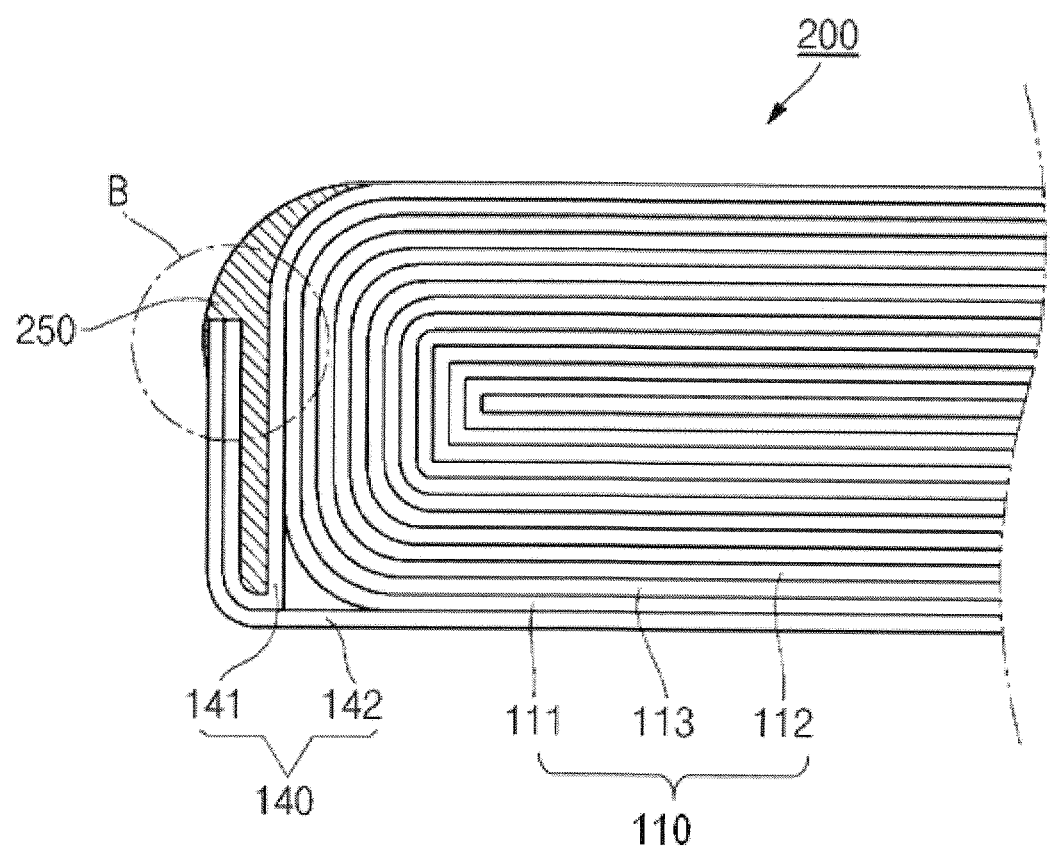
FIG. 4 is a cross-sectional view of another example of the pouch type battery taken along the line I-I' of FIG. 1.
Figure 5:
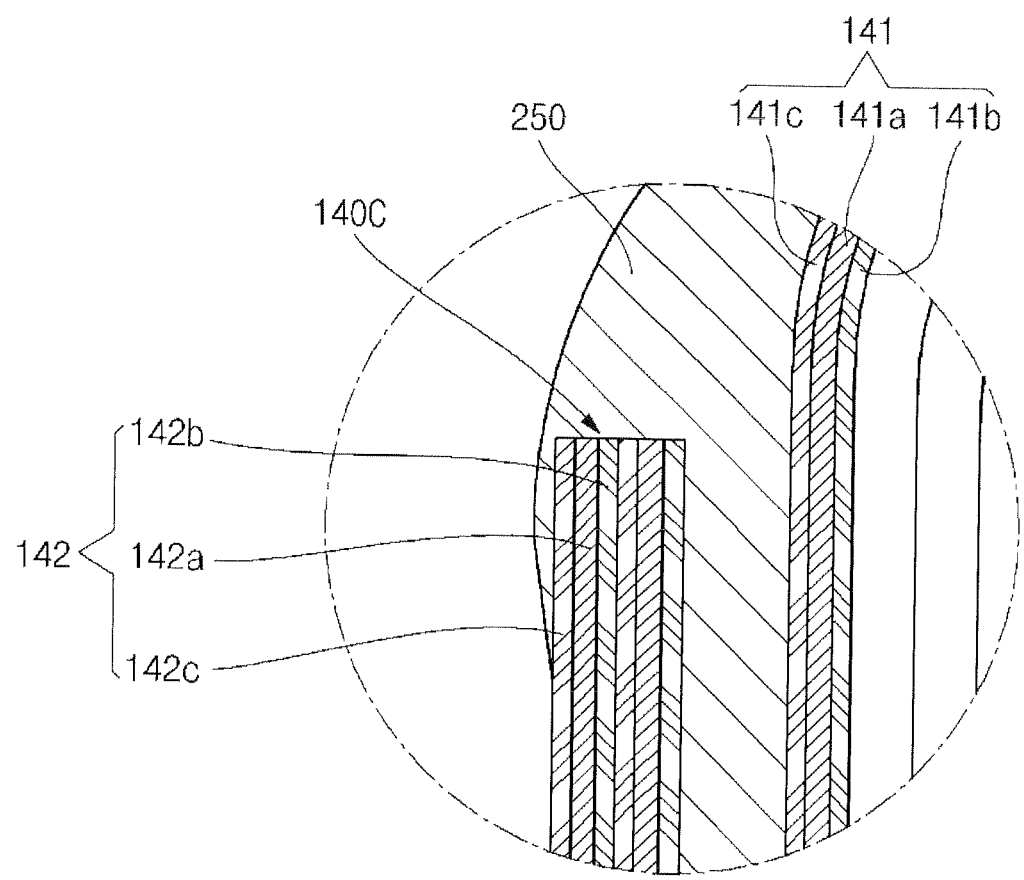
FIG. 5 is an enlarged view illustrating a 'B' portion of FIG. 4.

FIG. 4 is a cross-sectional view of another example of the pouch type battery taken along the line I-I' of FIG. 1, and FIG. 5 is an enlarged view illustrating a 'B' portion of FIG. 4.

As shown in FIGS. 4 and 5, the pouch type battery 200 is substantially the same as the pouch type battery 100 according to the previous embodiment of the present invention, except for the presence of a photocurable adhesive 250. Thus, the description of the embodiment that follows relates to the photocurable adhesive 250.

The photocurable adhesive 250 is disposed between interior sides of adhesion parts 140a adhered to external surfaces of the first pouch 141, and is coated between an end 140c of the adhesion parts 140a and sides of the first pouch 141. That is to say, the photocurable adhesive 250 is coated to entirely cover the interior bent sides of the adhesion parts 140a, the end 140c and the external surfaces of the first pouch 141.

The photocurable adhesive 250 is hardened with UV radiation to adhere and fix the adhesion parts 140a of the pouch 140 to the pouch 140. The photocurable adhesive 250 isolates the metal layers 141a and 142a exposed to the ends 140c of the adhesion parts 140a from the external devices. Therefore, the photocurable adhesive 250 can prevent an electrical short circuit between the metal layers 141 a and 142a and the external devices by blocking the metal layers 141a and 142a from being exposed to the outside.

The photocurable adhesive 250 can fix the adhesion parts 140a of the pouch 140 to the pouch 140 without using a separate tape and can protect the metal layers 141 a and 142a exposed to the ends 140c of the adhesion parts 140a from the external devices.

The pouch type battery according to the embodiments of the present invention may not require performing a taping process additionally performed to protect the metal layers exposed to the ends of the adhesion parts from the external devices using the photocurable adhesive, thereby simplifying and automating the manufacturing process of the pouch type battery. In addition, the pouch type battery according to the embodiments of the present invention may increase adhesion strength by adhering and fixing the adhesion parts to the pouch and may enhance adhesion quality by securing adhered positions using the photocurable adhesive.

While this invention has been described in connection with what is presently considered to be practical exemplary embodiments of a pouch type battery, it is to be understood that the invention is not limited to the disclosed embodiments, but, rather is intended to cover various modifications and equivalent arrangements included within the spirit and scope of the appended claims.

What is claimed is:
1. A pouch type battery, comprising:
an electrode assembly including
a first electrode plate,
a second electrode plate and
a separator;
a pouch accommodating the electrode assembly, said pouch comprising:
a first pouch composed of a metal layer sandwiched between two insulation layers having adhesion parts formed on edges of the first pouch and at opposing sides of the first pouch; and
a second pouch composed of a metal layer sandwiched between two insulation layers having adhesion parts formed on edges of the second pouch by adhering the adhesion parts of first pouch; and a photocurable adhesive in direct contact solely with and disposed on the opposing side surfaces of the pouch and the adhesion parts, adheres the adhesion parts to the opposing side surfaces of the pouch and covers ends of the adhesion parts bent toward the opposing side surfaces of the pouch, said photocurable adhesive covering a portion of an exterior surface of the first pouch and not the entire exterior side surface of the first pouch and a portion of an exterior surface of the second pouch sealing the pouch, and said photocurable adhesive is in direct contact with and covers end segments of the two insulation layers and the metal layer of each of the first and second pouches and portions of surfaces of the two insulation layers of each of the first and second pouches.

2. The pouch type battery of claim 1, the photocurable adhesive adhering and fixing the adhesion parts of the first and second pouches to the opposing sides of the pouch.

3. The pouch type battery of claim 1, the first pouch and second pouch being folded on one side along a length of the pouch.

4. The pouch type battery of claim 3, further comprising a planar part connecting between the adhesion parts and formed at the opposing sides by adhering the first pouch and the second pouch.

5. The pouch type battery of claim 4, further comprising:
a first electrode tab being electrically connected to the first electrode plate of the electrode assembly and exposed to the outside through the planar part of the pouch; and
a second electrode tab being electrically connected to the second electrode plate of the electrode assembly and exposed to the outside through the planar part of the pouch.

6. The pouch type battery of claim 3, the adhesion parts being bent toward the first pouch and fixed to the opposing side surfaces of the pouch by the photocurable adhesive.

7. The pouch type battery of claim 1, the photocurable adhesive being a two-component adhesive having an insulating hardener and an insulating resin that are hardened by ultraviolet (UV) rays.

8. A pouch type battery, comprising:
an electrode assembly;
a pouch accommodating the electrode assembly, said pouch comprising:
a first pouch composed of a metal layer sandwiched between two insulation layers having adhesion parts formed at opposing sides of the first pouch; and
a second pouch composed of a metal layer sandwiched between two insulation layers having adhesion parts formed by adhering the adhesion parts of first pouch; and
a photocurable adhesive in direct contact solely with and disposed between the opposing side surfaces of the pouch and interior sides of the adhesion parts, adheres the adhesion parts to the opposing side surfaces of the pouch and covers ends of the adhesion parts bent toward the opposing side surfaces of the pouch, said photocurable adhesive covering a portion of an exterior surface of the first pouch and not the entire exterior side surface of the first pouch and a portion of an exterior surface of the second pouch sealing the pouch, and said photocurable adhesive is in direct contact with and covers end segments of the two insulation layers and the metal layer of each of the first and second pouches and portions of surfaces of the two insulation layers of each of the first and second pouches.

9. The pouch type battery recited in claim 8, the first pouch and the second pouch being folded on one side along a length of the pouch.

10. The pouch type battery recited in claim 9, further comprising a planar part connecting the adhesion parts and formed at the opposing sides by adhering the first pouch and the second pouch.

11. The pouch type battery recited in claim 10, further comprising:
a first electrode tab electrically connected to the first electrode plate of the electrode assembly and exposed to the outside through the planar part of the pouch; and
a second electrode tab electrically connected to the second electrode plate of the electrode assembly and exposed to the outside through the planar part of the pouch.

12. The pouch type battery recited in claim 9, the adhesion parts being bent toward the first pouch and fixed to the opposing side surfaces of the pouch by the photocurable adhesive.

13. The pouch type battery recited in claim 12, the photocurable adhesive covering ends of the adhesion parts and the opposing sides of the pouch,
said photocurable adhesive being a two-component adhesive having an insulating hardener and an insulating resin that are hardened by ultraviolet (UV) rays.

* * * * *